US011507060B2

(12) United States Patent
Sawyer et al.

(10) Patent No.: US 11,507,060 B2
(45) Date of Patent: Nov. 22, 2022

(54) SYSTEMS AND METHODS FOR SELECTING PROCESSES TO MANUFACTURE AN OBJECT

(71) Applicant: Paperless Parts, Inc., Boston, MA (US)

(72) Inventors: Scott M. Sawyer, Auburndale, MA (US); Dana A. Wensberg, Boston, MA (US); Jason Ray, Boston, MA (US); William H. Headrick, IV, Boston, MA (US); John Peck, Boston, MA (US); Lucas M. Duros, Dorchester, MA (US); Nicky Chu, Malden, MA (US); James L. Jacobs, II, Rye, NH (US)

(73) Assignee: Paperless Parts, Inc., Boston, MA (US)

( * ) Notice: Subject to any disclaimer, the term of this patent is extended or adjusted under 35 U.S.C. 154(b) by 0 days.

(21) Appl. No.: 17/558,711

(22) Filed: Dec. 22, 2021

(65) Prior Publication Data
US 2022/0197251 A1     Jun. 23, 2022

Related U.S. Application Data

(60) Provisional application No. 63/129,066, filed on Dec. 22, 2020, provisional application No. 63/213,952, filed on Jun. 23, 2021.

(51) Int. Cl.
*G05B 19/4155* (2006.01)

(52) U.S. Cl.
CPC .......... *G05B 19/4155* (2013.01); *G05B 2219/31372* (2013.01); *G05B 2219/49023* (2013.01)

(58) Field of Classification Search
None
See application file for complete search history.

(56) References Cited

U.S. PATENT DOCUMENTS

| 6,999,965 B1 | 2/2006 | Cesarotti et al. |
| 7,164,958 B2 | 1/2007 | Leino et al. |
| 7,349,894 B2 | 3/2008 | Barth et al. |

(Continued)

OTHER PUBLICATIONS

Gao et al., Product Data Management as a Key Component of Integrated Enterprise Information Systems , Dec. 31, 2002.

*Primary Examiner* — Sean Shechtman
(74) *Attorney, Agent, or Firm* — Caldwell Intellectual Property Law

(57) ABSTRACT

In an aspect a system for selecting a plurality of entities to manufacture an object. A system includes a computing device. A computing device is configured to receive one or more files providing a design of an object to be manufactured. A computing device is configured to identify a first comprehensive process for manufacturing an object using a first exterior element. A computing device is configured to identify a second comprehensive process for manufacturing an object using a second exterior element. A computing device is configured to communicate a first comprehensive process and a second comprehensive process to one or more third parties. A computing device is configured to receive a first exterior element dataset and a second exterior element dataset. A computing device is configured to generate an objective function. A computing device is configured to provide a selection of a process.

20 Claims, 7 Drawing Sheets

(56) References Cited

U.S. PATENT DOCUMENTS

| | | |
|---|---|---|
| 7,613,648 B2 | 11/2009 | Fortes et al. |
| 7,712,058 B2 | 5/2010 | Brathwaite et al. |
| 8,712,858 B2 | 4/2014 | Blair et al. |
| 10,552,882 B1 | 2/2020 | Jacobs, II et al. |
| 10,803,501 B1 | 10/2020 | Jacobs, II et al. |
| 11,023,934 B1 | 6/2021 | Jacobs, II et al. |
| 2002/0035450 A1* | 3/2002 | Thackston ......... G05B 19/4099 703/1 |
| 2006/0253403 A1 | 11/2006 | Stacklin et al. |
| 2008/0059220 A1 | 3/2008 | Roth et al. |
| 2012/0320058 A1 | 12/2012 | Stephen |
| 2020/0019145 A1* | 1/2020 | Vedam ............... G05B 19/4155 |
| 2020/0302092 A1 | 9/2020 | Vanker et al. |
| 2020/0401113 A1* | 12/2020 | Yuan ............... G05B 19/41865 |

\* cited by examiner

SYSTEMS AND METHODS FOR SELECTING PROCESSES TO MANUFACTURE AN OBJECT

CROSS-REFERENCE TO RELATED APPLICATIONS

This application claims the benefit of priority of U.S. Provisional Patent Application Ser. No. 63/129,066 filed on Dec. 22, 2020, and titled "METHODS AND SYSTEMS OF SECURE, MACHINE-ASSISTED COLLABORATION FOR REGULATED MANUFACTURING DATA", and U.S. Provisional Patent Application Ser. No. 63/213,952, filed on Jun. 23, 2021, and titled "METHODS AND SYSTEMS OF SECURE, MACHINE-ASSISTED COLLABORATION FOR REGULATED MANUFACTURING DATA", each of which is incorporated by reference herein in their entirety.

FIELD OF THE INVENTION

The present invention generally relates to the field of manufacturing an object. In particular, the present invention is directed to a system and method for selecting processes to manufacture an object.

BACKGROUND

Modern manufacturing processes pose a wide array of variables to account for in order to minimize cost and time. Sorting through the wide array of variables is time consuming in itself. As such, modern manufacturing processes are inefficient and can be improved.

SUMMARY OF THE DISCLOSURE

In an aspect a system for selecting a plurality of entities to manufacture an object is presented. A system includes a computing device. A computing device is configured to receive one or more files providing a design of an object to be manufactured. A computing device is configured to identify as a function of a design a first comprehensive process for manufacturing an object using a first exterior element. A computing device is configured to identify as a function of a design a second comprehensive process for manufacturing an object using a second exterior element. A first exterior element is distinct from a second exterior element. A computing device is configured to communicate a first comprehensive process and a second comprehensive process via one or more application programming interfaces to one or more remote computing devices of third parties. A computing device is configured to receive from one or more remote computing devices, via one or more application programming interfaces, a first exterior element dataset and a second exterior element dataset. A computing device is configured to generate an objective function of a first exterior element dataset and a second exterior element dataset. A computing device is configured to provide a selection of a process of a first comprehensive process and a second comprehensive process based on an objective function.

In another aspect a method of selecting a plurality of entities to manufacture an object is presented. A method includes receiving at a computing device one or more files providing a design of an object to be manufactured. A method includes identifying at a computing device as a function of a design a first comprehensive process for manufacturing an object using a first exterior element. A method includes identifying at a computing device as a function of a design a second comprehensive process for manufacturing an object using a second exterior element. A method includes communicating a first comprehensive process and a second comprehensive process via one or more application programming interfaces to one or more remote computing devices of third parties. A method includes receiving from one or more remote computing devices via one or more application programming interfaces a first exterior element dataset and a second exterior element dataset. A method includes generating an objective function of a first exterior element dataset and a second exterior element dataset. A method includes providing a selection of a process of a first comprehensive process and a second comprehensive process based on an objective function.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
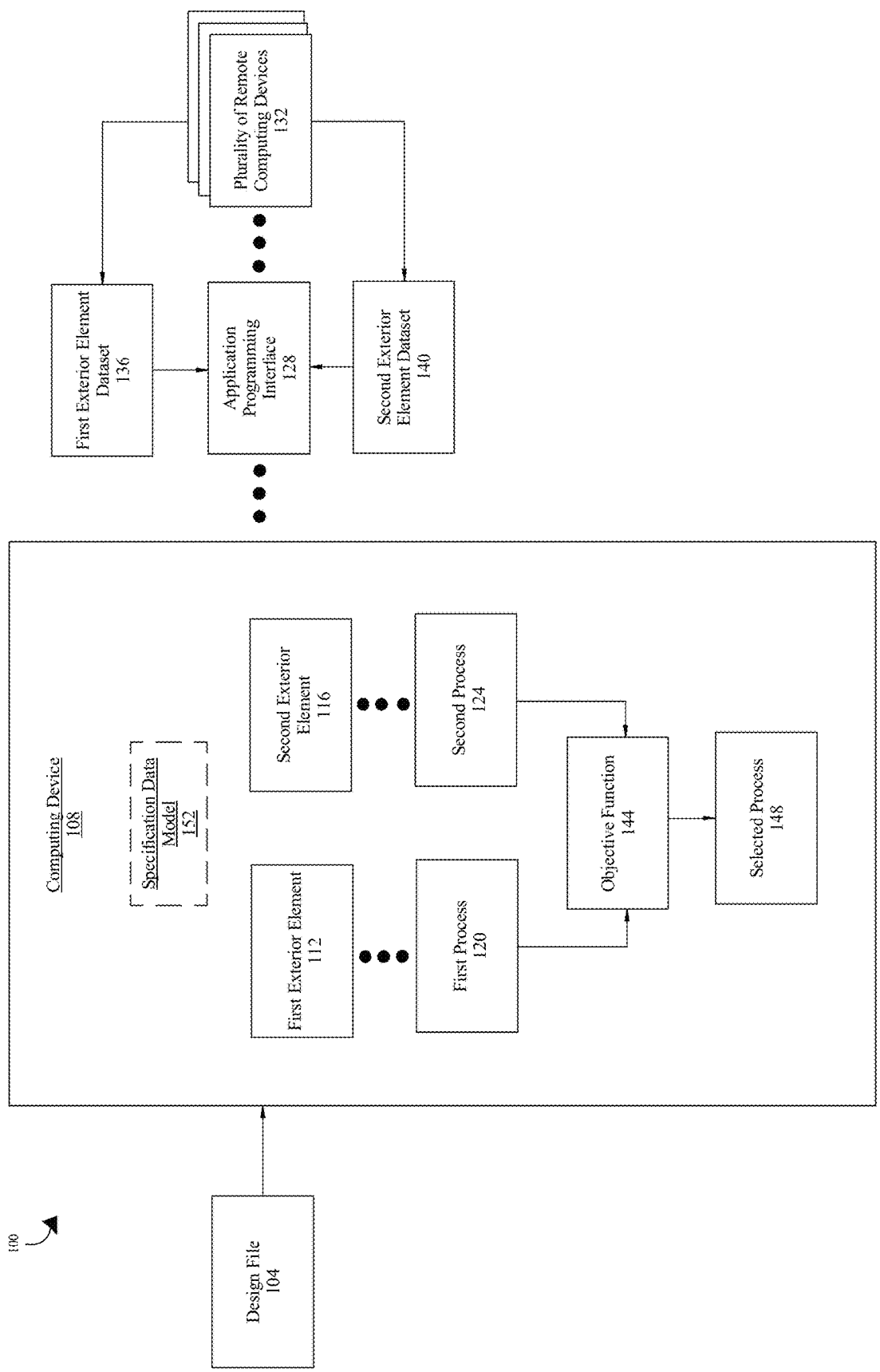
FIG. 1 is a block diagram of a system for selecting a plurality of entities to manufacture an object.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Described herein is a system for selecting a plurality of entities to manufacture an object. A system may include a computing device. A computing device may be configured to receive one or more files providing a design of an object to be manufactured. A computing device may be configured to identify as a function of a design a first comprehensive process for manufacturing an object using a first exterior element. A computing device may be configured to identify as a function of a design a second comprehensive process for manufacturing an object using a second exterior element. A first exterior element may be distinct from a second exterior element. A computing device may be configured to communicate a first comprehensive process and a second comprehensive process via one or more application programming interfaces to one or more remote computing devices of third parties. A computing device may be configured to receive from one or more remote computing devices, via one or more application programming interfaces, a first exterior element dataset and a second exterior element dataset. A computing device may be configured to generate an objective function of a first exterior element dataset and a second exterior element dataset. A computing device may be configured to provide a selection of a process of a first comprehensive process and a second comprehensive process based on an objective function.

Described herein is a method of selecting a plurality of entities to manufacture an object. A method may include receiving at a computing device one or more files providing a design of an object to be manufactured. A method may include identifying at a computing device as a function of a design a first comprehensive process for manufacturing an object using a first exterior element. A method may include identifying at a computing device as a function of a design a second comprehensive process for manufacturing an object using a second exterior element. A method may include communicating a first comprehensive process and a second comprehensive process via one or more application programming interfaces to one or more remote computing devices of third parties. A method may include receiving from one or more remote computing devices via one or more application programming interfaces a first exterior element dataset and a second exterior element dataset. A method may include generating an objective function of a first exterior element dataset and a second exterior element dataset. A method may include providing a selection of a process of a first comprehensive process and a second comprehensive process based on an objective function.

Systems and methods described in this disclosure may perform and/or support one or more manufacturing processes and/or process steps. Manufacturing, as described herein, may be performed according to any manufacturing process or combination of manufacturing processes. Manufacturing process may include an additive manufacturing process. In an embodiment, an additive manufacturing process is a process in which material is added incrementally to a body of material in a series of two or more successive steps. A material may be added in the form of a stack of incremental layers; each layer may represent a cross-section of an object to be formed upon completion of an additive manufacturing process. Each cross-section may, as a non-limiting example be modeled on a computing device as a cross-section of graphical representation of the object to be formed; for instance, a computer aided design (CAD) tool may be used to receive or generate a three-dimensional model of an object to be formed, and a computerized process, such as a "slicer" or similar process, may derive from that model a series of cross-sectional layers that, when deposited during an additive manufacturing process, together will form the object. Steps performed by an additive manufacturing system to deposit each layer may be guided by a computer aided manufacturing (CAM) tool. Persons skilled in the art will be aware of many alternative tools and/or modeling processes that may be used to prepare a design for additive manufacture, including without limitation the production of stereolithography (STL) files and the like. In an embodiment, a series of layers are deposited in a substantially radial form, for instance by adding a succession of coatings to the workpiece. Similarly, a material may be added in volumetric increments other than layers, such as by depositing physical voxels in rectilinear form or other forms. Additive manufacturing, as used in this disclosure, may include manufacturing done at an atomic or nano level.

Additive manufacturing may also include manufacturing bodies of material that are produced using hybrids of other types of manufacturing processes; for instance, additive manufacturing may be used to join together two portions of a body of material, where each portion has been manufactured using a distinct manufacturing technique. A non-limiting example may be a forged body of material. an example of a forged body of material may have welded material deposited upon it, which then comprises an additive manufactured body of material.

Deposition of material in an additive manufacturing process may be accomplished by any suitable means, including without limitation any "three-dimensional printing" process. Deposition may be accomplished by stereo lithography, in which successive layers of polymer material are deposited and then caused to bind with previous layers using a curing process such as curing using ultraviolet light, for example. Additive manufacturing processes may include fused deposition modeling processes, in which a polymer material is deposited in a molten or otherwise fluid form in successive layers, each of which is cured by natural cooling or other means. Additive manufacturing processes may include processes that deposit successive layers of powder and binder; the powder may include polymer or ceramic powder, and the binder may cause the powder to adhere, fuse, or otherwise join into a layer of material making up the body of material or product.

Likewise, additive manufacturing may be accomplished by immersion in a solution that deposits layers of material on a body of material, by depositing and sintering materials having melting points such as metals, such as selective laser sintering, by applying fluid or paste-like materials in strips or sheets and then curing that material either by cooling, ultraviolet curing, and the like, any combination of the above methods, or any additional methods that involve depositing successive layers or other increments of material. Methods of additive manufacturing may include without limitation vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing or combine two or more methods. Companies producing additive manufacturing equipment include 3D Systems, Stratasys, formLabs, Carbon3D, Solidscape, voxeljet, ExOne, envisiontec, SLM Solutions, Arcam, EOS, Concept Laser, Renishaw, XJET, HP, Desktop Metal, Trumpf, Mcor, Optomec, Sciaky, and MarkForged amongst others.

Examples of additively manufactured bodies of material include, but are not limited to, plates, slabs, blooms, billets, boards, blocks, among many other shapes, including curvilinear and multisided shapes, and any combination thereof, as set forth in further detail below. As for material(s) composing an additively manufactured body of material, the material(s) may be any suitable material(s), such as metal (solid, sintered, etc.), polymer (solid, foamed, etc.), composite, and multilayer material, or any combination of such materials, among others. Additively manufactured bodies of material may include shapes, such as organic shapes, which have been scanned, for instance and without limitation using LIDAR or similar scanning techniques; scanned shapes may be comprised of primitive shapes, which may be mapped and then additively manufactured. Fundamentally, there is no limitation on the composition of an additively manufactured body of material.

Manufacturing methods may include one or more subtractive processes. As used herein, a subtractive manufacturing process is a process that is performed by removal of material from a workpiece. A subtractive manufacturing process may be any suitable subtractive manufacturing process, such as, but not limited to, rotary-tool milling, electronic discharge machining, ablation, etching, erosion, cutting, and cleaving, among others. Fundamentally, there is no limitation on the type of subtractive manufacturing process(es) that may be used. In an example, differing subtractive manufacturing processes may be used before at different stages or to perform different steps of the subtractive manufacturing process as described below.

If rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In an embodiment, milling equipment used for removing material may be of the computerized numerical control (CNC) type that is automated and operates by precisely programmed commands that control movement of one or more parts of the equipment to effect the material removal. CNC machines, their operation, programming, and relation to CAM tools and CAD tools are well known and need not be described in detail herein for those skilled in the art to understand the scope of the present invention and how to practice it in any of its widely varying forms.

Subtractive manufacturing may be performed using spark-erosive devices; for instance, subtractive manufacturing may include removal of material using electronic discharge machining (EDM). EDM may include wire EDM, plunge EDM, immersive EDM, ram EDM, or any other EDM manufacturing technique. Subtractive manufacturing may be performed using laser-cutting processes. Subtractive manufacturing may be performed using water-jet or other fluid-jet cutting techniques. Fundamentally, any process for removal of material may be employed for subtractive manufacturing.

Manufacturing processes may include molding processes. As used herein, a molding process may be any process wherein a malleable material, defined as a material that adopts the shape of a cavity into which it is inserted, is inserted into a cavity in an object, known as a "mold," formed to impose a desired shape on material inserted therein. Malleable material may include, without limitation, molten metal or polymer material, fluids curable through heat, chemical reaction, or radiation, froths composed of malleable material with bubbles dispersed therethrough, putty or clay-like malleable solids, and the like. Insertion may be accomplished by pouring, pressing, blowing, injecting, or otherwise introducing malleable material into the cavity of the mold. Malleable material may be cured or otherwise allowed to solidify or become more viscous; this process may be accomplished by allowing materials to cool until they enter a solid or more viscous state, heating to change the chemical nature of materials, curing by irradiation such as ultraviolet radiation, curing by mixture of chemicals to produce a solid or more viscous substance, and the like. Molding processes may include, without limitation, injection molding, blow molding, compression molding, extrusion molding, matrix molding, laminating, or any other molding process.

Manufacturing processes may include one or more processes for the manipulation of sheet material. Sheet material may be any material presented in a sheet of substantially uniform thickness, including without limitation sheets of metal, polymer material such as plastic, and the like. Manipulation of sheets of material may include, without limitation, bending, forming, stretching, cutting, and/or stamping the material. Manipulation may be performed, as a non-limiting example, using one or more cutting or stamping dies.

Manufacturing processes may include finishing and/or coating processes. Finishing and/or coating may be a process in which additive, subtractive, or other methods are used to create a desired surface characteristic or the like in a completed product or component. Finishing and/or coating may include polishing or smoothing processes. Finishing and/or coating may include deposition of material on one or more surfaces of a workpiece, part, or component. Finishing and/or coating may include, without limitation, painting, grinding, dying, laser ablation, laser engraving, polymer coating, plating with metals, abrasive blasting, burnishing, buffing, such as by electroplating, blanching, case-hardening, peening, burnishing, glazing, cladding, conversion coating, knurling, galvanizing, varnishing, plasma-s praying, corona treatment, application of vitreous enamel, thin-film deposition, magnetic field-assisted finishing, or any other suitable treatment for producing a finished surface.

Referring now to FIG. 1, an exemplary embodiment of a system 100 for selecting processes to manufacture an object is illustrated. System 100 includes computing device 108. Computing device 108 may include any computing device as described in this disclosure, including without limitation a microcontroller, microprocessor, digital signal processor (DSP) and/or system on a chip (SoC) as described in this disclosure. Computing device 108 may include, be included in, and/or communicate with a mobile device such as a mobile telephone or smartphone. Computing device 108 may include a single computing device operating independently, or may include two or more computing device operating in concert, in parallel, sequentially or the like; two or more computing devices may be included together in a single computing device or in two or more computing devices. Computing device 108 may interface or communicate with one or more additional devices as described below in further detail via a network interface device. Network interface device may be utilized for connecting computing device 108 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 108 may include but is not limited to, for example, a computing device or cluster of computing devices in a first location and a second computing device or cluster of computing devices in a second location. Computing device 108 may include one or more computing devices dedicated to data storage, security, distribution of traffic for load balancing, and the like. Computing device 108 may distribute one or more computing tasks as described below across a plurality of computing devices of computing device, which may operate in parallel, in series, redundantly, or in any other manner used for distribution of tasks or memory between computing devices. Computing device 108 may be implemented using a "shared nothing" architecture in which data is cached at the worker, in an embodiment, this may enable scalability of system 100 and/or computing device 108.

With continued reference to FIG. 1, computing device 108 may be designed and/or configured to perform any method, method step, or sequence of method steps in any embodiment described in this disclosure, in any order and with any degree of repetition. For instance, computing device 108 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 108 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 108 is configured to receive and/or store design file 104. Design file 104 may include one or more files describing an object and/or part to be manufactured. Design file 104 may be assigned a unique number or code by the entity procuring the part to be manufactured. A unique identifier may be a locally unique identifier; that is, it may uniquely identify a design file 104 within system 100. More generally unique identifiers may be used, including, without limitation, globally unique identifiers (GUIDs) or universally unique identifiers (UUIDs). Design file 104 may include a combination of engineering drawings, 3D models in some open or proprietary format, documents (including contracts), third-party specifications (including MILSPEC), and more. For instance, and without limitation, design file 104 may include a graphical model of a part. A graphical model may be any model used to simulate visually one or more features of the part, including without limitation a CAD file, CAM file, STL file, or the like. A graphical model may be stored in a memory of computing device 108 in any suitable manner. In some embodiments, one or more features of a part may include any geometric shape to be formed on the part by any manufacturing process. One or more features of a part may include one or more materials or combinations of materials that will make up the part, a finish of the part, an intended physical characteristic of the part such as hardness, flexibility, or the like, or any other detail concerning the manufacture of the part.

Still referring to FIG. 1, design file 104 may include one or more annotated files, which may include without limitation files generated by a document-producing program such as a word processor, image manipulation program or portable document format (PDF) program; at least a document-producing program may be usable to produce a document containing a combination of images, such as views of models of products to be manufactured, with text including instructions by users of manufacturer and/or designer client devices and/or other users indicating a manner in which such users wish for manufacture of the products to be manufactured to be performed. Design file 104 may be used to describe a part that may be developed by mechanical engineers, industrial designers, and/or part designers with other qualifications. An objective of design file 104 may be to communicate a part's form, fit and function. Generally, design file 104 may not indicate how a part should be manufactured, but rather may defines acceptance criteria for individual parts. In some cases, design file 104 may include complete or partial manufacturing instructions, typically when there is no obvious way to manufacture a part to specification and when designers create the design file 104 with certain manufacturing constraints in mind. The following is a non-limiting list of examples of criteria that may be included in design file 104: material (including references to national or global standards or to other third-party specifications); material properties (including chemical, mechanical, magnetic, optical, electrical, and the like); shape/geometry (as defined by perspective drawings or a digital 3D model); geometric dimensions; tolerances (critical measurement points and their acceptable tolerances); surface finish; markings; hole taps or inserts; hardware and fasteners; finishing (including chemical or electrical plating, paint, coatings, and abrasive treatments); washing and/or de-greasing; quality requirements (including measurement sampling and adherence to manufacturing quality standards); and/or packaging requirements.

In some embodiments, and still referring to FIG. 1, design file 104 may be proprietary in nature; for instance, design file 104 may represent intellectual property of the company procuring the parts, or on whose behalf a third-party is procuring the parts. Design file 104 may be subject to additional regulation, such International Traffic in Arms Regulations (ITAR), other types of export control, and/or other regulations that require special handling of sensitive data. Design file 104 may change over time. In some cases, a change may be indicated by a change in a part number and/or another code or identifier, and/or by a revision number or code. In other cases, design file 104 may be updated without an associated change in title or metadata.

With continued reference to FIG. 1, computing device 108 may be configured to generate specification data model 152 as a function of design file 104. Specification data model 152 may include a data model and/or data structure that stores a complete design file 104. Specification data model 152 may store one or more files of design file 104 and/or representations thereof, in any suitable file format and/or according to any suitable storage modality. Specification data model 152 may include links between files or other data modalities; in other words, generation of specification data model 152 may include generation of links between files or other data modalities. As a non-limiting example, a line or annotation on an engineering drawing may be linked to a corresponding face, edge, or other feature in a 3D model; a link may be a data element indicating that a first representation of a feature in a first file is a second representation of that feature in a second file. For instance, a link may indicate that a two-dimensional depiction of a feature in a first file, such as a face, hole, edge, or the like is a two-dimensional view, such as a side view, a perspective view, an isometric view, or the like, of a feature depicted as a three-dimensional object in a second file; measurements recorded in the depiction in the first file may be identified as the same measurements shown regarding the depiction in the second file, and other attributes recorded in first file may be identified as equivalent to attributes shown in first file. In addition to representing equivalencies, links between features in two or more elements or modalities or files may also carry other semantic meaning as defined by a predicate or set of attributes. For instance, a tolerance specified in GD&T in an engineering drawing may be linked to two elements in a 3D model with the predicate "applies to". This link may be determined automatically by an analysis algorithm, or the link may be established manually by a human operating a graphical or textual user interface. An analysis algorithm may include, without limitation, an algorithm for interrogation, for instance as described in this disclosure and/or in references incorporated by reference herein. One such algorithm may entail comparing features in a 3D representation to features in a 2D representation by projecting 3D features into a 2D representation from a set of various aspects of viewpoints. These 2D projections may be compared to features in a 2D drawing using a technique such as scan matching.

Still referring to FIG. 1, in some embodiments, in order to reduce computational complexity and to make the problem tractable in a reasonable amount of time, heuristics may be applied to limit a set of perspectives that must be considered. For example, an algorithm may assume that 2D drawings are perspective drawings taken pointing in a positive or negative X, Y or Z axis, and/or are other views typically provided and/or used in CAD or other 3D modeling programs; where a file type, metadata, or other information describes a particular 3D modeling program used to generate the 3D file, algorithm may set as default perspectives and/or projections a set of such defaults typically used by the particular program. A further heuristic may be applied to limit the number of scales or distances to be considered by comparing extents of a 2D drawing to a bounding box of a 3D model; alternatively, a metric used to determine closeness of a match may be designed to be scale-independent, such that a 2D drawing proportional to a perspective view is a match without scaling. Pairs of features may be similarly limited based on what features are visible from various perspectives, which may be determined, for example, by ray casting from various points on a face in a 3D model in a direction of a perspective being considered to determine whether that ray interferes with another part of the 3D model. To further increase the effectiveness and efficiency of a scan matching technique, scan matching may be performed in the Hough Domain, as computed via a Hough Transform of a 2D drawing and a 2D projection of a feature from a 3D model. Various matching criteria may be applied to determine an equivalency, for example by applying a threshold to a Normal Distributions Transform (NDT) score calculated when performing a scan match. An error function representing a difference between a perspective view and a 2D image may alternatively or additionally be minimized to derive a best fit, either by selecting a best-fit perspective view and/or by shifting perspective until the error function is minimized. Any or all of the above-described approaches may be combined in any combination. An analysis algorithm linking entities across data modalities may be provided by a platform owner and/or by a user or that user's organization. Annotations and/or modifications may be made in the modalities (e.g., drawing, 3D model, contract, or other multimedia format) most expressive for that annotation or modification and the associated meaning may be directly or indirectly applied across the other modalities. In other words, computing device 104 may detect a change in an attribute recorded regarding a feature in a first file and may automatically update a corresponding and/or identical attribute in a second file, as a function of the modification and a link. As a non-limiting example, in one embodiment, a user may select a tolerance specified using standard GD&T markup on an engineering drawing, and link that one or more geometric entities (e.g., faces and edges) in a 3D model. Alternatively, a link between features in a 3D model may be defined directly in or with respect to the 3D model, for example by using model-based definitions. In one embodiment, model-based definitions may be specified in a proprietary format as determined by a CAD system, or using an industry standard such as Quality Information Format (QIF).

Still referring to FIG. 1, dimensioning determined using, e.g., interrogators and/or extraction of textual information be utilized by consumers of 3D data, including humans using a 3D viewer GUI or by a CAM tool making a program for a computer-controlled manufacturing process. Examples of how this annotation may be consumed may include a human estimating a longer cycle time for a manufacturing operation or a CAM tool programming a CNC mill to operate with a different tool, at a different speed, or at a different feed rate to mill a feature with a tight tolerance. In another embodiment, a human user or algorithm may identify a set of geometric faces or edges as a higher-order feature, such a drilled hole or drilled and tapped hole. A human may make this association based on explicit knowledge or by fusing data across different files or modalities. An algorithm may infer these higher-order features using metadata within the CAD file, or by applying heuristics, such as inferring a drilled hole when an inner diameter of a cylinder matches a lookup table of standard hardware sizes within some linear tolerance; heuristics may be derived and/or generated according to any process described in this disclosure and/or in materials incorporated herein by reference. Computing device may then propagate such an inference to other faces and edges with identical or similar properties, for instance by detecting a link as described above and modifying depictions identified in the link, and/or by identifying depictions of features having one or more attributes in common with a feature to which inference was applied. An end result may include one rule or user action resulting in an identification of numerous features, such as holes, pockets, or the like. A 3D model with feature annotations may then be used to make work instructions, routing steps, cycle time estimations, or the like.

Still referring to FIG. 1, computing device 108 may determine a manufacturing process for an object as a function of design file 104. Computing device 108 may determine a manufacturing process for an object as a function of specification data model 152. As a non-limiting example, computing device 108 may receive a design file 104 for a metal part. Computing device 108 may determine manufacturing a metal part could include a machining process by identifying that all or a subset of the geometric features comprising the part can be subtractively manufactured from a stock material. In a more specific example, the computing device may determine that the part can be partially or completely manufactured using a turning operation (e.g., on a CNC lathe machine) by analyzing radial symmetry. This may be analyzed by first identifying the largest circular edge of the part, which defines a hypothetical axis of radial symmetry. Using this axis, the device gathers all other coaxial rotational-type faces (e.g., cylinders, cones, toroids, spheres, and the like). These faces are the potential faces that can be manufactured by a lathe. Next, a "check face" is constructed for each lathe face, such that the check face is offset slightly from the part geometry and the parameterization of the face (using boundary representation) is completed. The check face represents the path of where the lathe tool would need clearance to cut the face. Next, the computing device determines whether any check faces intersect with the part geometry. If there is an intersection, that means the potential lathe faces cannot be cut by a turning operation. In some embodiments, computing device 108 may determine a plurality of manufacturing processes for an object based on specification data model 152 and/or design file 104. Computing device 108 may determine a plurality of manufacturing data, such as, but not limited to, manufacturing materials, manufacturing processes, manufacturing time, and the like. In some embodiments, computing device 108 may include a computing device of a manufacturing facility. A "manufacturing facility" as used in this disclosure is any group of components and/or entities capable of producing materials, parts, and/or objects. Computing device 108 may be operated by an entity that may operate a manufacturing facility. In some embodiments, computing device 108 may include a controller of one or more automated manufacturing devices of a manufacturing facility. Computing device 108 may be configured to receive a user input that may specify a manufacturing process, materials, and the like for manufacturing an object. User input may be received from an external computing device. In other embodiments, user input may be received directly at computing device 108.

Still referring to FIG. 1, in some embodiments, computing device 108 may determine a first exterior element 112. An "exterior element" as used in this disclosure is any component, entity, service, and/or object outside of a manufacturing facility associated with computing device 108. First exterior element 112 may include a third party. In some embodiments, a third party may include, but is not limited to, material suppliers, manufacturers, operators of manufacturing devices, and the like. In some embodiments, first exterior element 112 may include a third party that may provide and/or manufacture an object. In some embodiments, data pertaining to first exterior element 112 may include data of a manufacturing process for an object by a third party. In other embodiments, data pertaining to first exterior element 112 may include data of a premade object or part of an object provided by a third party. Data pertaining to first exterior element 112 may include data about a third party such as, but not limited to, a manufacturing cost, manufacturing time, manufacturing quality, and the like. Data pertaining to first exterior element 112 may include data of one or more precursor parts. A "precursor part" as used in this disclosure is a partially manufactured object and/or component. In some embodiments, data pertaining to first exterior element 112 may include data describing and/or pertaining to one or more components. A "component," as used in this disclosure, is one or more materials that may be assembled into a finished object or part of an object, such as, but not limited to, sheet metal, plastics, screws, nails, tubes, pipes, and the like. For instance, in the case of subtractive manufacturing, materials may include stock, hardware, fasteners, cutting tools, fixtures, soft jaws, consumables such as coolant, wash, and/or sacrificial workholding pieces. As a further example, for additive manufacturing, materials may include powder, resin, and/or filaments used by 3D printing technology or the like. For casting and/or injection molding, materials may include a cast and/or mold, a template matching part geometry, and/or resin, metal, or other material casted to create a part and/or object. Component data may include stock material data. Stock material data may include, but is not limited to, size, shapes, dimensional tolerances, straightness, stock length, heat treatments, inventory, availability, price, and the like. Shapes of stock material may include, but is not limited to, rectangular prisms, cylindrical rods, cylindrical tubes, flat sheets, hexagonal rods, hexagonal tubes, rectangular tubes, L-shape rods, and/or other shapes. In some embodiments, stock material may be casted, 3D printed, or otherwise manufactured to "near net shape", such that a secondary subtractive process can complete additional features or get all dimensions to specification. Stock material may be procured to be larger than necessary in order to leave material for "tabs" that may greatly simplify fixturing or workpiece holding. In some embodiments, component data may include data of precursor parts and/or completed parts.

In some embodiments, and still referring to FIG. 1, data pertaining to first exterior element 112 may include services such as, but not limited to, finishing processes, broaching, drilling, lathe-based processes, polishing, surface coating, and the like. A "finishing process" as used in this disclosure is any step or set of steps performed last in a manufacturing of an object or part. Finishing processes may include, but are not limited to, spraying, powder coating, dip coating, electroplating, plating, anodizing, electroless plating, dyeing, and the like. In a non-limiting example, a user may want to machine a bolt hole. Data pertaining to first exterior element 112 may include an availability of a press drill.

As a non-limiting example, and still referring to FIG. 1, design file may call for use in manufacture of a shaped rod with bolt holes, which may be an object and/or a component; if formed as a rod with no holes at a third party manufacturing facility, the result may be a precursor to the rod with bolt holes, the latter of which may be drilled at a manufacturing facility associated with computing device 108 and/or by another third party site as a service. A user may order a rod and shape the rod using a CNC machine or other device, or may have the rod shaped by a third party having specialized equipment suitable for forming the rod efficiently, such as a grinder. A user may want to send the shaped rod to a third party for drilling bolt holes into the shaped rod; in each case, a decision whether to form either the rod or the holes therein using a machine at a manufacturing facility associated with computing device 108 may depend on costs and/or logistical overhead to have rod and/or bolt holes formed by a third party as weighed against machine runtimes in the manufacturing facility associated with the computing device 108. As a further example, a press drill may produce a bolt hole more quickly than a machine tool, which may warrant engagement of the third party to form holes as a service. In another non-limiting example design file may call for forming a keyhole. Data pertaining to first exterior element 112 may include an availability of a broaching device. A broaching device may produce a keyhole much more quickly than a machining process available at a manufacturing facility associated with computing device 108. In another non-limiting example design file may call for a rotationally symmetrical object, component, and/or precursor, which could be formed, given enough runtime, by a CNC machine. However, data pertaining to first exterior element 112 may show a third-party lathe may produce a rotationally symmetrical form much more quickly, which may justify use of third-party equipment to form such object, component, and/or precursor.

Still referring to FIG. 1, computing device 108 may determine second exterior element 116. Second exterior element 116 may include a third party that may provide and/or manufacture an object. In some embodiments, data pertaining to second exterior element 116 may include a process for producing an object by a third party. In other embodiments, data pertaining to second exterior element 116 may include data of a premade object or part of an object from a third party. Data pertaining to second exterior element 116 may include data about a third party such as, but not limited to, a manufacturing cost, manufacturing time, manufacturing quality, and the like. Data pertaining to second exterior element 116 may include, but is not limited to, precursor data, component data, and/or service data. In some embodiments, first exterior element 112 and second exterior element 116 are distinct from one another. First exterior element 112 may include a different third-party provider than second exterior element 116.

Still referring to FIG. 1, computing device 108 may determine first comprehensive process 120. A "first comprehensive process" as used in this disclosure is any set of steps for manufacturing an object or part of an object. First comprehensive process 120 may be determined as a function of first exterior element 112. First comprehensive process 120 may be determined based on specification data model 152 of design file 104. In some embodiments, first comprehensive process 120 may include a plurality of steps to manufacture an object and/or part of design file 104. A plurality of steps may include, but is not limited to, receiving materials and/or a precursor of an object, working on a workpiece of an object, ordering a premade part of an object, quality testing an object, and the like. In some embodiments, a precursor may include a partially completed object. In a non-limiting example, an object may need to have a certain shape along with bolt holes drilled into it. A precursor of this object may include a part having the certain shape but without the bolt holes. In some embodiments, computing device 108 may determine second comprehensive process 124. A "second comprehensive process" as used in this disclosure is any set of steps for manufacturing an object distinct from an initial set of steps for manufacturing an object. Second comprehensive process 124 may be determined as a function of second exterior element 116. Second comprehensive process 124 may be determined based on specification data model 152 of design file 104. In some embodiments, second comprehensive process 124 may include a plurality of steps to manufacture an object and/or part of design file 104. Second comprehensive process 124 may include a different set of steps than first comprehensive process 120. In some embodiments, second comprehensive process 124 may include similar or the same steps as first comprehensive process 120 but may be performed by a different entity, such as, but not limited to, a manufacturing facility distinct from a manufacturing facility associated with computing device 108. As a non-limiting example, a user may want to know if it is more cost-efficient, more time-efficient, and/or more material-efficient to order materials from a third party and manufacture an object a component thereof, and/or a precursor to an object and/or component themselves, or if it is cheaper to have a third party manufacture an object completely. In this example, data pertaining to first exterior element 112 may include materials from a third party and first comprehensive process 120 may include in-house manufacturing of an object using materials from a third party. Data pertaining to second exterior element 112 may include a third party that may manufacturing an object. Second comprehensive process 124 may include paying an external third party to manufacture an object from start to finish. In another non-limiting example, a user may want to know if an object can be manufactured in a shorter period of time by a third party or if an object can be manufactured in a shorter period of time by ordering materials from a third party and manufacturing an object in-house. In this example, data pertaining to first exterior element 112 may include a manufacturing time of an object by a third party. First comprehensive process 120 may include paying a third party to manufacture an object. Data pertaining to second exterior element 116 may include materials provided by a third party. Second comprehensive process 124 may include manufacturing an object using materials received from a third party. In a non-limiting example, specification data model 152 may describe a rod-like metal tube with a dimensioned outer diameter and inner diameter. A rod-like metal tube may also include features such as slots and holes that may require drilling, milling, or otherwise cutting a tube. An outer diameter of a rod-like metal tube may include a specified tolerance that may be tighter than a standard tolerance offered by stock metal sellers. There may be multiple ways to manufacture a rod-like metal tube with a dimensioned outer diameter and inner diameter to a specified tolerance. First comprehensive process 120 may include one manufacturing method, where a CNC lathe may be used by a manufacturing facility to reduce a larger outer diameter to a specified outer diameter within a set of tolerance bounds. Second comprehensive process 124 may include a second manufacturing method, where a manufacturing facility may procure a precision-ground rod from a third-party that satisfies an outer diameter dimension and tolerance. In another example, specification data model 152 may describe a box that may be formed from sheet metal. Two adjacent edges of formed sheet metal of a box may need to be attached in some way. First comprehensive process 120 may include one manufacturing method, where two adjacent edges of a formed sheet metal may be attached via weldment. Second comprehensive process 124 may include another manufacturing method, where two adjacent edges of formed sheet metal may be attached via hardware fasteners.

Still referring to FIG. 1, computing device 108 is configured to communicate to one or more remote computing devices of plurality of remote computing devices 132 through application programming interface (API) 128. An "application programming interface" as used in this disclosure is an intermediary software interface that allows two or more applications to communicate. Plurality of remote computing devices 132 may include a computing device of a third party. In some embodiments, computing device 108 may be configured to communicate to a plurality of remote devices of a plurality of third parties. Plurality of remote computing devices 132 may be configured to read, generator, and or analyze shapes of data pertaining to first exterior element 112 and/or second exterior element 116 using application programming interface 128. In some embodiments, API 128 may include a third-party API, such as without limitation a Python API, which may allow operators to create robust process "interrogations" capable of extracting crucial geometric parameters to inform and expedite the estimation and manufacturing process; API may alternatively or additionally be generated from and/or with regard to any interrogator as described in this disclosure. At any time within these interrogations, an operator may be able to post any sort of shape data, including actual files suitable for and/or part of design file 104, to a web browser via web-socket connection; thus, receipt of design file 104 may performed, without limitation, via application programming interface 128. API 128 may communicate first comprehensive process 120 and second comprehensive process 124 to plurality of remote computing devices 132. Communicating first comprehensive process 120 and second comprehensive process 124 may include sharing data such as, but not limited to, object type, object function, materials, type of manufacturing, parameter of manufacture, and the like. API 128 may be configured to query a multitude of components and services available from a plurality of third parties through plurality of remote computing devices 132. Components may include stock material such as, but not limited to, bars, rods, sheets, precision ground stock, near-net shape stock, extrusions, blanked sheets, and the like. Components may include hardware, such as, but not limited to, screws, bolts, fasteners, brackets, nuts, washers, shims, helical and threaded inserts, spacers, stand-offs, pins, anchors, nails, rivets, staples, key stock, retaining rings, cable ties, magnets, and the like. Components may include elements such as, but not limited to, electronics, integrated circuits, motors, bearings, pullies, springs, wire harnesses, valves, hoses, filters, compressors, tanks, assemblies, fittings, gauges, and the like. Services may include material preparation, such as, but not limited to, grinding, centerless grinding, casting, milling, blanking, laser cutting, waterjet cutting, saw cutting, and the like. Services may include finishing processes, such as, but not limited to, plating, anodizing, powder coating, sand blasting, and the like. Services may include quality assurance or inspection services, software services, and/or other services. API 128 may be configured to query each third party's components, services, and/or manufacturing capabilities. API 128 may request a complete or partial part specification from plurality of remote computing devices 132. Plurality of remote computing devices 132 may send a response to API 128 that may include a description of a component or service offered that may assist with one or more operations required to completely manufacture a part. In one embodiment, each component or service may connect to one or more "operation definitions," which represent a manufacturing operation and could be described using a domain specific language (DSL), such as Paperless Parts Pricing Language (P3L), which is a program that operates on part specification attributes, and other user-defined inputs, to produce a cost estimate, lead time estimate, and other user-defined key/value attributes. An API 128 response may include a reference to publicly defined operation definition or may contain embedded P3L code.

Still referring to FIG. 1, in some embodiments, a parameter of manufacture may include a quantity of parts to be made from a single blank, sheet, or other element or raw material. A parameter of manufacture may include a manufacturing tolerance range. A "manufacturing tolerance range" as used in this disclosure is a difference between a metric of a specification of an object and an actual metric of a produced object. In a non-limiting example, an object may include a length of 0.5 mm with a manufacturing tolerance range of +/−0.1 mm. In this case, any value between 0.4 mm and 0.6 mm of a length of the object is acceptable. In some embodiments, a parameter of manufacture may include, but is not limited to, one or more elements of a specification data model, third party manufacturing requirements, a budget of manufacture, a quality of manufacture, a manufacturing completion deadline, and the like. In some embodiments, computing device 108 may determine an amount of data of design file 104 and/or specification data model 152 to share with a third party though API 128. In a non-limiting example, design file 104 may include a desk. Computing device 108 may determine that a third party may only require specifications of legs for the desk. API 128 may share partial data of design file 104 in the form of desk leg specifications of specification data model 152. In some embodiments, computing device 108 may select file types, views, and the like of design file 104 to communicate to third parties through API 128. File types may include, but are not limited to, CAD files, 3D files, 2D files, and the like. Views may include, but are not limited to, perspective, isometric, oblique, exploded, and the like. In some embodiments, computing device 108 may select a CAD file to be communicated to a third party through API 128. In other embodiments, computing device 108 may select a 2D file to be communicated to a third party through API 128. Computing device 108 may select additional data such as dimensional information, annotations, and the like. API 128 may communicate a requested file type from a third party to computing device 108. In a non-limiting example, a third party may communicate to computing device 108 through API 128 that they require a full CAD file to manufacture an object or part. Computing device 108 may select a full CAD file of design file 104 to communicate with the third party through API 128.

Still referring to FIG. 1, computing device 108 may communicated with one or more of a plurality of remote computing devices 132. A remote device of plurality of remote devices 132 may be configured to generate a first exterior element dataset 136. A "first exterior element dataset" as used in this disclosure is any information about an object, service, and/or entity outside of a manufacturing facility. First exterior element dataset 136 may include data pertaining to first exterior element 112. First exterior element dataset 136 may include, but is not limited to, manufacturing time, manufacturing cost, manufacturing quality, manufacturing tolerance range, geometry of a provided object or objects as described by a 3D CAD file and/or specification drawing or blueprint, and the like. Plurality of remote computing devices 132 is configured to generate second exterior element dataset 140. Second exterior element dataset 140 may include data of second exterior element 116. Second exterior element dataset 140 may include, but is not limited to, manufacturing time, manufacturing cost, manufacturing quality, manufacturing tolerance range, geometry of a provided object or objects as described by 3D CAD file and/or specification drawing or blueprint, and the like. In some embodiments, application programming interface 128 may receive a plurality of datasets from plurality of remote computing devices 132. Application programming interface 128 may be configured to communicate first exterior element dataset 136 and second exterior element dataset 140 to computing device 108. In some embodiments, application programming interface 128 may communicate a plurality of datasets from plurality of remote computing devices 132 to computing device 108. Computing device 108 may be configured to update first comprehensive process 120 and/or second comprehensive process 124 based on first exterior element dataset 136 and second exterior element dataset 140. Updating a process may include, but is not limited to, updating a manufacturing time, updating one or more steps of a process, updating a manufacturing cost, updating a manufacturing tolerance range, and the like. In some embodiments, updating a process may include, but is not limited to, updating one or more machines used, updating components needed, updating third party requirements, updating in-house manufacturing steps, and the like. In a non-limiting example, a process may include manufacturing a bent tube. Computing device 108 may update the manufacturing of the bent tube from machining a tube out of a block of metal to ordering a premade tube and using an in-house machine to bend the tube.

Still referring to FIG. 1, system 100 may include objective function 144. An "objective function" as used in this disclosure is a process of minimizing or maximizing one or more values based on a set of constraints. Computing device 108 may generate objective function 144 to optimize a manufacturing process. In some embodiments, objective function 144 of computing device 108 may include an optimization criterion. An optimization criterion may include any description of a desired value or range of values for one or more attributes of a manufacturing process; desired value or range of values may include a maximal or minimal value, a range between maximal or minimal values, or an instruction to maximize or minimize an attribute. As a non-limiting example, an optimization criterion of at least an optimization criterion may specify that the part should be manufactured as quickly as possible (i.e., may instruct that manufacturing time be minimized); an optimization criterion may cap manufacturing time, for instance specifying that it must be completed before a certain date or time, or within a certain period of time. An optimization criterion may alternatively request that manufacturing time be greater than a certain value. An optimization criterion may specify one or more tolerances for precision in manufacturing. An optimization criterion may specify one or more desired physical attributes for the manufacturing process. An optimization criterion may specify a soonest delivery date, considering the current schedule of all work centers and equipment at a manufacturing facility. In an embodiment, at least an optimization criterion may assign weights to different attributes or values associated with attributes; weights, as used herein, may be multipliers or other scalar numbers reflecting a relative importance of a particular attribute or value. One or more weights may be expressions of value to designer and/or manufacturer of a particular outcome, attribute value, or other facet of manufacturing process; value may be expressed, as a non-limiting example, in remunerative form, such as a quantity of a medium of exchange, a monetary unit, or the like. As a non-limiting example, minimization of manufacturing time may be multiplied by a first weight, while tolerance above a certain value may be multiplied by a second weight. Optimization criteria may be combined in weighted or unweighted combinations into a function reflecting an overall outcome desired by a user; function may be a cost function to be minimized and/or maximized. Function may be defined by reference to manufacturing constraints and/or weighted aggregation thereof as provided by plurality of remote computing devices 132; for instance, a cost function combining optimization criteria may seek to minimize or maximize a function of manufacturing constraints.

Still referring to FIG. 1, computing device 108 may use objective function 144 to compare first comprehensive process 120 and second comprehensive process 124. Generation of objective function 144 may include generation of a function to score and weight factors to achieve a process score for each feasible pairing. In some embodiments, pairings may be scored in a matrix for optimization, where columns represent objects and rows represent processes potentially paired therewith; each cell of such a matrix may represent a score of a pairing of the corresponding object to the corresponding process. In some embodiments, assigning a predicted process that optimizes the objective function includes performing a greedy algorithm process. A "greedy algorithm" is defined as an algorithm that selects locally optimal choices, which may or may not generate a globally optimal solution. For instance, computing device 108 may select pairings so that scores associated therewith are the best score for each order and/or for each process. In such an example, optimization may determine the combination of processes such that each object pairing includes the highest score possible.

Still referring to FIG. 1, objective function 144 may be formulated as a linear objective function. Computing device 108 may solve objective function 144 using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all objects r, S is a set of all processes s, $c_{rs}$ is a score of a pairing of a given object with a given process, and $x_{rs}$ is 1 if an object r is paired with a process s, and 0 otherwise. In some embodiments, for manufacturing processes, objects, and/or services with non-fixed parameters, such as variable cost, lead time, and/or quality, an objective function may include a probability distribution describing possible discrete or continuous values and a likelihood for the values to take a certain value or range of values. For example, a cost may be described by a normal distribution to account for randomness in market conditions. In another example, a lead time may follow a lognormal distribution that quantifies how an object is unlikely to be delivered sooner than estimated but it may be delivered later due to extenuating circumstances and delays; this distribution may have a "long tail" that assigns some likelihood of a good or service being delivered significantly late without bounding the delay. Continuing the example, constraints may specify that each object is assigned to only one process, and each process is assigned only one object. Processes may include compound processes as described above. Sets of processes may be optimized for a maximum score combination of all generated processes. In various embodiments, computing device 108 may determine a combination of objects that maximizes a total score subject to a constraint that all objects are paired to exactly one process. Not all processes may receive an object pairing since each process may only produce on object. In some embodiments, objective function 144 may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on computing device 108 and/or another device in system 100, and/or may be implemented on third-party solver. Objective function may be minimized using stochastic gradient descent and/or any other optimization and/or minimization process described in this disclosure. In some embodiments, if an objective function is not smooth or not differentiable, a solver may employ a "brute force" parameter sweep to search for optimal arguments. For probabilistic objective functions, a solver may consider the mode of the distribution or a maximum likelihood estimator to estimate a probabilistic value. A solver may use a monte Carlo technique for evaluating probabilistic value.

With continued reference to FIG. 1, optimizing objective function 144 may include minimizing a loss function, where a "loss function" is an expression an output of which an optimization algorithm minimizes to generate an optimal result. As a non-limiting example, computing device 108 may assign variables relating to a set of parameters, which may correspond to score components as described above, calculate an output of mathematical expression using the variables, and select a pairing that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs. Objectives represented in an objective function and/or loss function may include minimization of manufacturing times. Objectives may include minimization of costs of manufacturing an object. Objectives may include minimization of resources used. Objectives may include minimization of a difference between an object design file and a produced object. Objectives may include minimization of loss of object quality.

Still referring to FIG. 1, computing device is configured to output selected process 148 as a function of objective function 144. Selected process 148 may include first comprehensive process 120 or second comprehensive process 124. In some embodiments, selected process 148 may include another process distinct from first comprehensive process 120 and second comprehensive process 124. In some embodiments, selected process 148 may include a set of instructions for manufacturing an object. Selected process 148 may include a plurality of steps for manufacturing an object from start to finish. In other embodiments, selected process 148 may include a plurality of steps for completing a manufacturing of an object based on a current step of manufacture. Selected process 148 may include, but is not limited to, a manufacturing process type, manufacturing materials, manufacturing completion time, manufacturing tolerance range, third party involvement, and the like. In some embodiments, computing device 108 may display selected process 148 to a user through a graphical user interface (GUI). In some embodiments, computing device 108 may be configured to display selected process 148 and a second-best process. Selected process 148 may be presented as a sequence of manufacturing steps. A sequence of manufacturing steps may be in a chronological order. In some embodiments, a sequence of manufacturing steps may indicate a current step in a manufacturing process. Computing device 108 may display a cost, estimated completion, tolerance range, and the like of selected process 148. In some embodiments, computing device 108 may present selected process 148 to a user in comparison to another process. In a non-limiting example, selected process 148 may be displayed alongside a second-best process. Selected process 148 may include a breakdown of part type, cost, completion time, quality, tolerance range, and the like. Continuing this example, a breakdown of a second-best process may be compared to selected process 148, such as cost, completion time, quality, tolerance range, and the like. Selected process 148 may include one or more steps of onsite manufacturing and one or more steps of third-party provisions. As a non-limiting example, selected process 148 may include ordering sheet metal from a third party as a step and machining a metal rod from the sheet metal onsite as another step. In another non-limiting example, selected process 148 may include manufacturing a plurality of metal rods onsite as a step and sending out the plurality of metal rods to be joined together by a third party as another step. In some embodiments, every step of selected process 148 may include onsite manufacturing. In some embodiments, every step of selected process 148 may include third party services. Computing device 108 may provide selected process 148 per object, iteratively, and/or simultaneously. Computing device 108 may use a machine-learning model trained on training data correlating comprehensive processes to selected processes. Training data may be received from user input, external computing devices, previous iterations of processing, and/or crowd sourcing. Computing device 108 may input first comprehensive process 120 and/or second comprehensive process 124 in a machine learning model that may output selected process 148.

Figure 2:
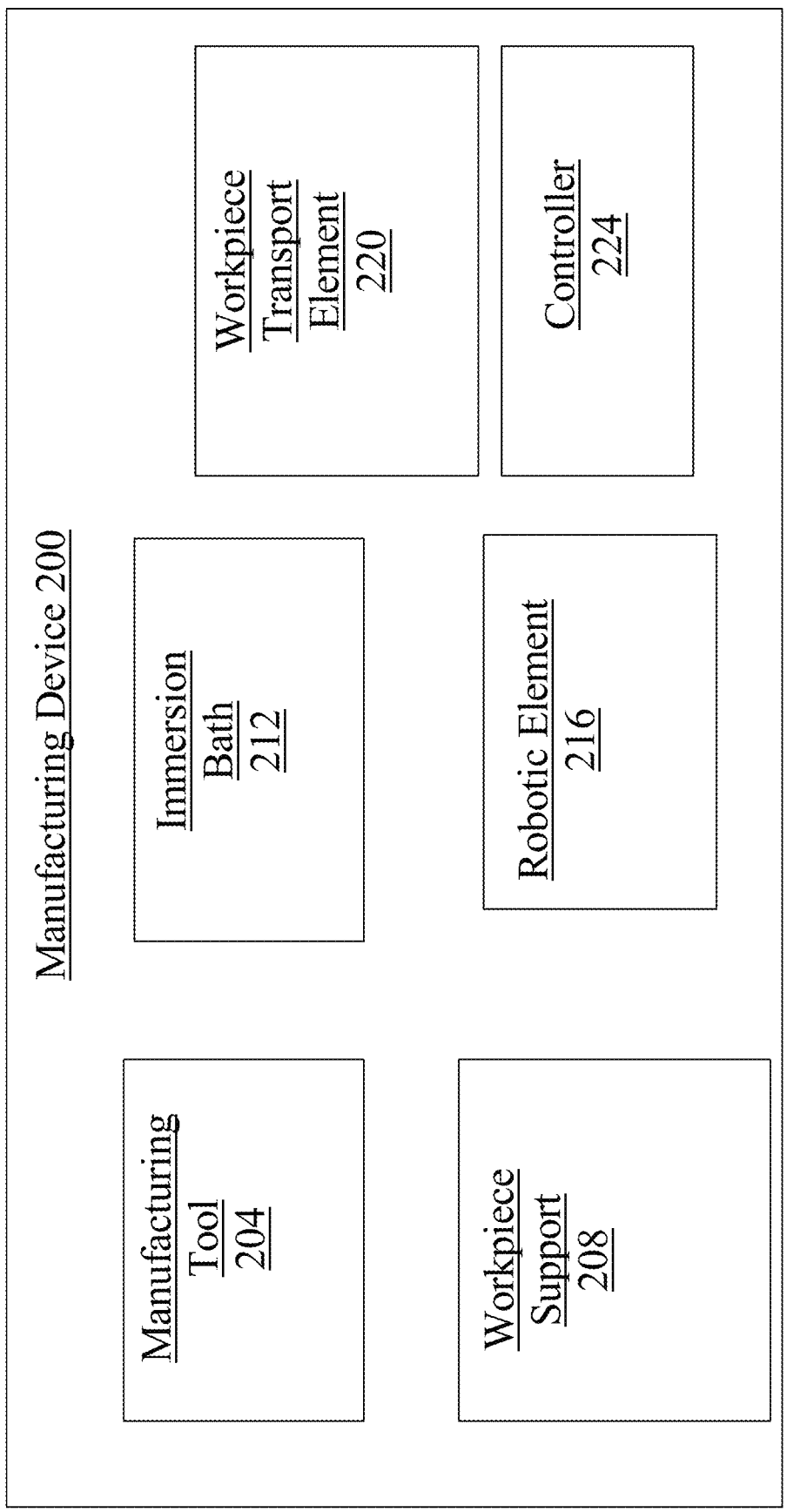
FIG. 2 is an exemplary embodiment of a manufacturing device.

Referring now to FIG. 2, a block diagram of an exemplary embodiment of a manufacturing device 200 is illustrated. Manufacturing device 200 may include at least a manufacturing tool 204. At least a manufacturing tool 204 may be any device that modifies a workpiece to produce a product. Manufacturing tool 204 may include an applicator or other additive device. For instance, manufacturing tool 204 may include a printer head for a 3D printer. Manufacturing tool 204 may include an extruding device for extruding fluid or paste material, a sprayer or other applicator for bonding material, an applicator for powering, a sintering device such as a laser, or other such material. Manufacturing tool 204 may include a cutting tool. Cutting tool may be a component that removes material from workpiece. In some embodiments, cutting tool includes at least an endmill, which may be a component that removes material when rotated against workpiece. Persons skilled in the art will be aware of many variants of endmill that may be used to remove material from a workpiece. Cutting tool may include a component that transfers motion from a motor (not shown) to at least an endmill; as a non-limiting example, component may be a spindle that rotates and as a result causes endmill to rotate. Manufacturing tool 204 may include a tool changer that can switch a plurality of endmills onto and off of manufacturing tool 204; for instance, tool changer may detach an endmill currently attached to a spindle and attach a different endmill to the same spindle, enabling the automated manufacturing device 200 to use more than one endmill in a single automated manufacturing process. Manufacturing tool 204 may include a tool changer that can switch a plurality of endmills onto and off of manufacturing tool 204. Manufacturing tool 204 may include a die. Manufacturing tool 204 may include a mold. Manufacturing tool 204 may include one or more nozzles, applicators, or other devices for introducing material to a mold. Manufacturing tool 204 may include a welder or other joining device.

Continuing to view FIG. 2, manufacturing device 200 may include a workpiece support 208. Workpiece support 208 may be a structure that supports a workpiece during the one or more manufacturing steps. Workpiece support 208 may include a base table. Base table may include a surface to which a workpiece or other components may be secured. Surface may be oriented horizontally, vertically, or in any other orientation. Surface may be substantially planar. Base table may include various mechanisms to attach components or workpieces to base table; for instance, base table may include a quick release attachment mechanism that can be used to attach any component having appropriate attachment features such as quick-release studs. Workpiece support 208 may include a fixture, which as used herein is a component used in a manufacturing device 200 to secure a workpiece to the manufacturing device 200 during the one or more manufacturing steps. A fixture may include, without limitation, one or more clamps, fasteners, vices, bolts, studs, quick-release attachment devices, straps, and chucks. A fixture may be one element of a set of fixtures; for instance, a workpiece may be secured in an automated manufacturing system by a plurality of fixtures, such as a plurality of bolts.

Workpiece support 208 may include a substrate for initial deposition of material in an additive process.

Still viewing FIG. 2, manufacturing device 200 may include one or more additional elements, such as an immersion bath 212 for stereolithography, EDM, or other processes requiring immersion. Manufacturing device 200 may include one or more robotic elements robotic element 216, including without limitation robot arms for moving, rotating, or otherwise positioning a workpiece, or for positioning a manufacturing tool 204 to work on workpiece. Manufacturing device 200 may include one or more workpiece transport elements 220 for moving a workpiece or finished part or component from one manufacturing stage to another; workpiece transport elements 220 may include conveyors such as screw conveyors or conveyor belts, hoppers, rollers or other items for moving an object from one place to another.

Still referring to FIG. 2, in some embodiments, manufacturing device 200 may include a mechanical manufacturing device 200. A "mechanical manufacturing device" as used herein is a manufacturing device that deprives the user of some direct control over the toolpath, defined as movements the manufacturing tool 204 and workpiece make relative to one another during the one or more manufacturing steps. For instance, manufacturing tool 204 may be constrained to move vertically, by a linear slide or similar device, so that the only decision the user may make is to raise or lower the manufacturing tool 204; as a non-limiting example, where manufacturing device 200 is a manually operated machine tool, user may only be able to raise and lower a cutting tool and have no ability to move the cutting tool horizontally. Similarly, where manufacturing tool 204 is a slide lathe, a blade on the slide lathe may be constrained to follow a particular path. As a further example, base table may be moveable along one or more linear axes; for instance, base table may be constrained to move along a single horizontal axis. In other embodiments, base table is constrained to movement along two horizontal axes that span two dimensions, permitting freedom of movement only in a horizontal plane; for instance, base table may be mounted on two mutually orthogonal linear slides.

Still referring to FIG. 2, mechanical manufacturing device 200 may include one or more components that have movement constrained to rotation. As a non-limiting example, a fixture of a lathe to which a workpiece is attached may be constrained to rotate about an axis, constraining the workpiece to rotate about the axis as well. As a non-limiting example, manufacturing device 200 may include a rotary table. Rotary table may be able to rotate an object, such as a fixture or workpiece, mounted to a work surface of rotary table through an axis of rotation; rotary table may be able to rotate through at least 360 degrees. Objects may be attachable to rotary table using quick-release studs, bolts, or other attachment mechanisms. In some embodiments, base table is a rotary table. In other embodiments, rotary table is mounted on base table. Rotary table may have an axis of rotation parallel to surface of base table. Rotary table may be able to rotate an object mounted to rotary table through an axis perpendicular to a direction of application of manufacturing tool 204. In some embodiments, this enables manufacturing tool 204 to modify a workpiece mounted to rotary table at any exposed point of the workpiece that may be rotated to face manufacturing tool 204. Multiple rotary elements may be combined to enable additional rotational degrees of freedom, for instance using a trunnion table or similar apparatus. Components constrained to rotation and components constrained to linear movement may be combined in various ways. For instance, and without limitation, a trunnion table may be mounted to a base table having x and y-axis linear slides; this may be combined with a z-axis linear slide, for instance bearing the manufacturing tool, resulting in a "five-axis" mechanical manufacturing device 200, such as those sometimes described as five-axis CNC machines. Similarly, a rotational table having an axis in the z direction may be combined with a base table having one or more linear slides and/or a trunnion table or other rotary table.

Still referring to FIG. 2, manufacturing device 200 may include a powered manufacturing device 200. As used herein, a "powered manufacturing device" is a manufacturing device in which at least one component of the manufacturing device includes at least a component powered by something other than human power. At least a component may be powered by any non-human source, including without limitation electric power generated or stored by any means, heat engines including steam, internal combustion, or diesel engines, wind power, waterpower, pneumatic power, or hydraulic power. Powered components may include any components of manufacturing device 200. Manufacturing tool 204 may be powered; for instance, manufacturing tool 204 may include an endmill mounted on a spindle rotated by a motor (not shown). Workpiece support 208 may be powered. Where manufacturing device 200 is a mechanical device, motion of components along linear or rotary constraints may be powered; for instance, motion of base table along one or more linear constraints such as linear slides may be driven by a motor or other source of power. Similarly, rotation of rotary table may be driven by a power source. Tool-changer, where present, may be driven by power. In some embodiments, all or substantially all of the components of manufacturing device 200 are powered by something other than human power; for instance, all components may be powered by electrical power.

Still referring to FIG. 2, manufacturing device 200 may include an automated manufacturing system. In some embodiments, an automated manufacturing system may include a manufacturing device 200 including a controller 224 that controls one or more manufacturing steps automatically. Controller 224 may include a sequential control device that produces a sequence of commands without feedback from other components of automated manufacturing system. Controller 224 may include a feedback control device that produces commands triggered or modified by feedback from other components. Controller 224 may perform both sequential and feedback control. In some embodiments, controller 224 includes a mechanical device. In other embodiments, controller 224 includes an electronic device. Electronic device may include digital or analog electronic components, including without limitation one or more logic circuits, such one or more logic gates, programmable elements such as field-programmable arrays, multiplexors, one or more operational amplifiers, one or more diodes, one or more transistors, one or more comparators, and one or more integrators. Electronic device may include a processor. Electronic device may include a computing device. Computing device may include any computing device as described below in reference to FIG. 5. Computing device may include a computing device embedded in manufacturing device 200; as a non-limiting example, computing device may include a microcontroller 224, which may be housed in a unit that combines the other components of manufacturing device 200. Controller 224 may include a manufacturer client of plurality of manufacturer clients; controller 224 may be communicatively coupled to a manufacturer client of plurality of manufacturer clients.

Still referring to FIG. 2, controller 224 may include a component embedded in manufacturing device 200; as a non-limiting example, controller 224 may include a microcontroller 224, which may be housed in a unit that combines the other components of manufacturing device 200. Further continuing the example, microcontroller 224 may have program memory, which may enable microcontroller 224 to load a program that directs manufacturing device 200 to perform an automated manufacturing process. Similarly, controller 224 may include any other components of a computing device as described below in reference to FIG. 5 in a device housed within manufacturing device 200. In other embodiments, controller 224 includes a computing device that is separate from the rest of the components of manufacturing device 200; for instance, controller 224 may include a personal computer, laptop, or workstation connected to the remainder of manufacturing device 200 by a wired or wireless data connection. In some embodiments, controller 224 includes both a personal computing device where a user may enter instructions to generate a program for turning workpiece into a finished product, and an embedded device that receives the program from the personal computing device and executes the program. Persons skilled in the art will be aware of various ways that a controller 224, which may include one or more computing devices, may be connected to or incorporated in an automated manufacturing system as described above.

Still referring to FIG. 2, controller 224 may control components of automated manufacturing system; for instance, controller 224 may control elements including without limitation tool changer to switch endmills, spindle or gear systems operatively coupled to spindle to regulate spindle rotational speed, linear movement of manufacturing tool 204, base table, or both, and rotation or rotational position of rotary table. As an example, in embodiments involving subtractive manufacturing, the equipment used for removing material may be of the computerized numerical control (CNC) type that is automated and operates by precisely programmed commands that control movement of one or more parts of the equipment to effect the material removal. CNC machines, their operation, programming, and relation to computer aided manufacturing (CAM) tools and computer aided design (CAD) tools are well known and need not be described in detail herein for those skilled in the art to understand the scope of the present invention and how to practice it in any of its widely varying forms. Similarly, controller 224 may coordinate deposition and/or curing of material in additive manufacturing processes, where manufacturing device 200 is an additive manufacturing device 200. Persons skilled in the art, upon reading the entirety of this disclosure, will be aware of similar automated control systems usable for various forms manufacturing.

Figure 3:
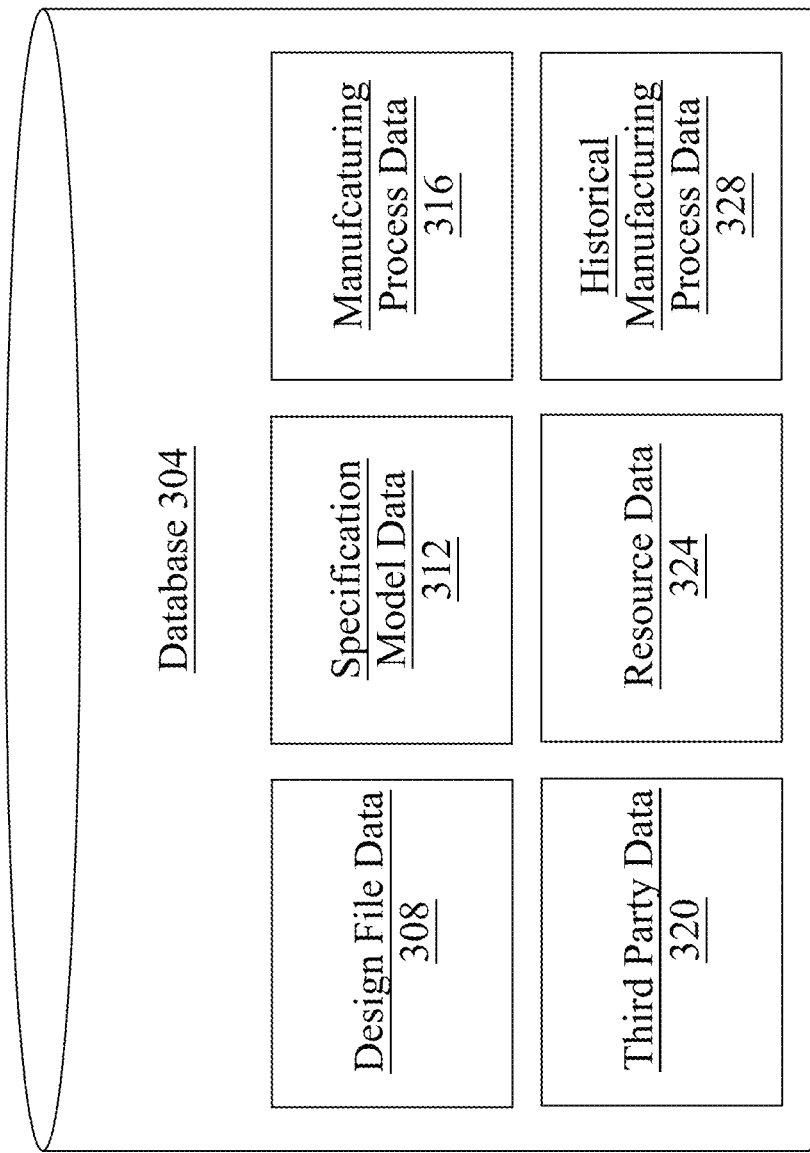
FIG. 3 is a block diagram of an exemplary embodiment of a manufacturing database.

Referring now to FIG. 3, a manufacturing database 304 is illustrated. In some embodiments, computing device 108 may generate selected process 148 based on a history of user preference, history manufacturing processes, history of objects manufactured, history of third-party performance, and the like. Computing device 108 may compare first comprehensive process 120, second comprehensive process 124, objective function 144, and data from database 304 to determine selected process 148.

Still referring to FIG. 3, manufacturing database 304 may be implemented, without limitation, as a relational database, a key-value retrieval database such as a NOSQL database, or any other format or structure for use as a database that a person skilled in the art would recognize as suitable upon review of the entirety of this disclosure. Database 304 may alternatively or additionally be implemented using a distributed data storage protocol and/or data structure, such as a distributed hash table or the like. Database 304 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 3, database 304 includes design file data 304. Design file data 308 may include a plurality of data of a plurality of design files. In some embodiments, design file data 308 may include a history of design files used. In some embodiments, design file data 308 may include data of an entire manufactured object. In other embodiments, design file data 308 may include a part of an object to be manufactured. A design file may be as described above with reference to FIG. 1.

Still referring to FIG. 3, database 304 includes specification model data 312. Specification model data 312 may include a plurality of specifications for an object or part thereof to be manufacture. Specification model data 312 may include, but is not limited to, height, length, width, material, tolerance range, structural strength, part function, object function, and the like. Specification model data 312 may be updated based on design file data 308. In some embodiments, specification model data 312 may include a history of specification models of objects or parts thereof corresponding to previously used design files. In some embodiments, specification model data may include a manufacturing threshold of an object or part thereof. A manufacturing threshold may include a range of variability in a structure and/or quality of a manufactured object that may be considered acceptable. In some embodiments, specification model data 312 may be as described above in reference to FIG. 1.

Still referring to FIG. 3, database 304 includes manufacturing process data 316. Manufacturing process data 316 may include a plurality of steps for manufacturing a plurality of objects and/or parts of objects. Manufacturing process data 316 may include, but is not limited to, job shop manufacturing, repetitive manufacturing, discrete manufacturing, batch process manufacturing, continuous process manufacturing, 3D printing, machining, joining, forming, casting, coating, and the like. Manufacturing process data 316 may correlate a manufacturing process to a design file and/or specification model data.

Still referring to FIG. 3, database 304 includes third party data 320. Third party data 320 may include data about one or more third parties used in a manufacturing process of an object. Third party data 320 may include a historic performance of a third party of an object or part. Third party data 320 may include, but is not limited to, party type, party cost, party efficiency, party resources, and the like. Third party data 320 may include data categorizing various third parties to various manufacturing processes. In a non-limiting example, third party data 320 may include data that Joe's Job Shop is proficient in machining metal rods. In another non-limiting example, third party data 320 may include data that Austin's Parts provides cheap steel materials. In another non-limiting example, third party data 320 may include data that Larry's Manufacturing has high quality premade components. Third party data 320 may include availability of a third party to work on manufacturing an object. Third party data 320 may include distances between third parties and a user.

Still referring to FIG. 3, database 304 includes resource data 324. Resource data 324 may include a quantity of resources of an entity. Resources may include, but are not limited to, materials, machines, personnel, objects, parts of objects, and the like. Resource data 324 may include data relating a specific resource to a specific object to be manufactured. In a non-limiting example, resource data 324 may include data showing a low onsite supply of aluminum for aluminum rods.

Still referring to FIG. 3, database 304 includes historical manufacturing process data 328. Historical manufacturing process data 328 may include a plurality of previous completed manufacturing processes for a plurality of objects, designs, and/or parts. Historical manufacturing process data 328 may include, but is not limited to, previous manufacturing completion times, manufacturing costs, manufacturing tolerance ranges, materials used, processes used, third parties used, and the like.

Figure 4:
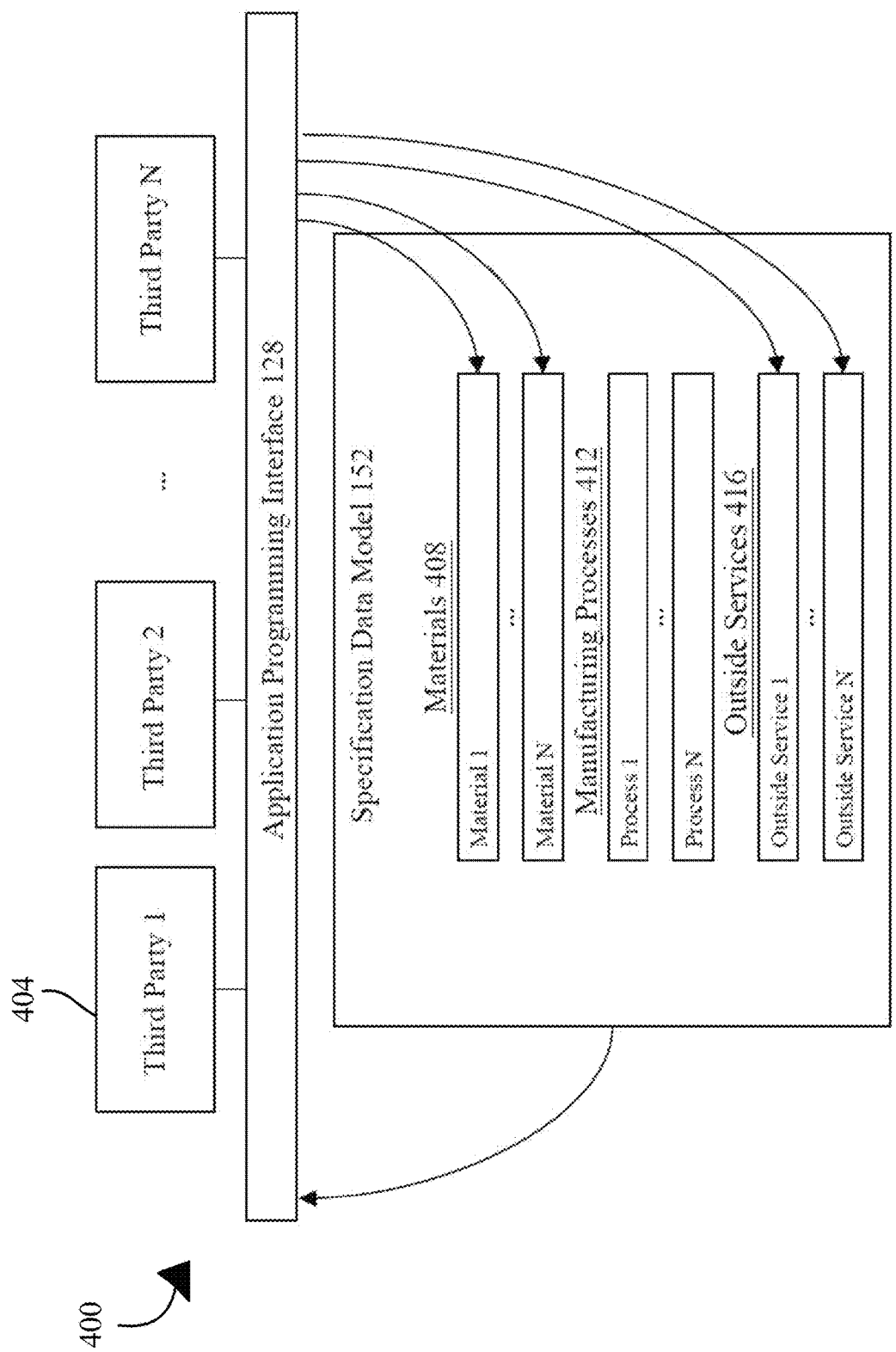
FIG. 4 is another exemplary embodiment of a system for selecting a plurality of entities to manufacture an object.

Referring now to FIG. 4, another exemplary embodiment of a system for selecting a plurality of entities to manufacture an object 400 is shown. System 400 may include API 128. API 128 may be as described above in FIG. 1. API 128 may be configured to communicate specification data model 152 to one or more third parties 404. Third parties 404 may include, but are not limited to, suppliers, manufactures, and the like. API 128 may communicate a part or an entirety of specification data model 152 to third parties 404. As a non-limiting example, API 128 may communicate materials needed to produce an object to third parties 408. As another non-limiting example, API 128 may communicate all or part of specification data model 152 to third parties 408. Specification data model 152 may include materials 408. Materials 408 may include one or more components that may be required to produce a part or entirety of specification data model 152. As a non-limiting example, materials 408 may include, but are not limited to, metal rods, wooden stands, glassware, nuts, bolts, rivets, screws, sheet metals, and the like. Specification data model 152 may include manufacturing processes 412. Manufacturing processes 412 may include one or more procedures needed to produce a part or entirety of an object described by specification data model 152. Manufacturing processes 412 may include, but are not limited to, broaching, drilling, bolting, lathing, and the like. As a non-limiting example, manufacturing processes 412 may include drilling a hole into a piece of sheet metal. Manufacturing processes 412 may include in-house processes that may not require third party services. Manufacturing processes 412 may be as described above in FIG. 1. Specification data model 152 may include outsider services 416. Outside services 416 may include any third-party services that may be required to produce a component as described by specification data model 152. Outside services 416 may include, but are not limited to, transporting materials, fabricating parts, finishing processes, and the like. API 128 may communicate specification data model 152 to one or more third parties 408. In some embodiments, API 128 may query through third parties 408 as a function of materials 412, manufacturing processes 416, and/or outside services 420. API 128 may query with a set of parameters such as, but not limited to, cost, time, likeliness of materials and/or parts needed, and the like. As a non-limiting example, a user may want to produce a curved and bolted steel rod. However, a user may have steel and a bolting machine, but may not have access to a machine to form a curved steel rod nor have bolting materials. API 128 may communicate parts of specification data model 152 to third parties 408 such as materials 408 including bolting materials, manufacturing processes 412 including in-house bolting, and outside services 416 including forming a curved rod. API 128 may query through third parties 408 to find materials 408, manufacturing processes 412, and/or outside services 416 from third parties 408. API 128 may produce results that a third party of third parties 408 may have curved steel rods in stock, a curved rod machine, bolting services, bolting materials, and the like.

Still referring to FIG. 4, API 128 may be configured to communicate specific requests for producing an object to third parties 404. Specific requests may include, but are not limited to, materials, services, and the like. As a non-limiting example, API 128 may communicate a specific request for machining a rod out of a steel alloy. API 128 may query through third parties 404 for specifically manufacturing processes for machining a rod out of a steel alloy. In some embodiments, a choice point machining learning model may be used to identify choice points of specification data model 152. Choice points may include factors that influence a decision of manufacturing an object. Choice points may include, but are not limited to, hardware, manufacturing processes, materials, and the like. A choice point machine learning model may be trained on training data correlating specification data models to choice points. Training data may be received from user input, remote computing devices, previous iterations of processing, and/or crowd sourcing. In some embodiments, a choice point machine learning model may be configured to input a specification data model and output one or more choice points of manufacturing an object described by the specification data model. API 128 may communicate choice point outputs from a choice point machine learning model to third parties 404. As a non-limiting example, a choice point machine learning model may output a lathing process as a choice point for manufacturing a wooden chair described by a specification data model. API 128 may communicate a request for a lathing process to third parties 404.

Figure 5:
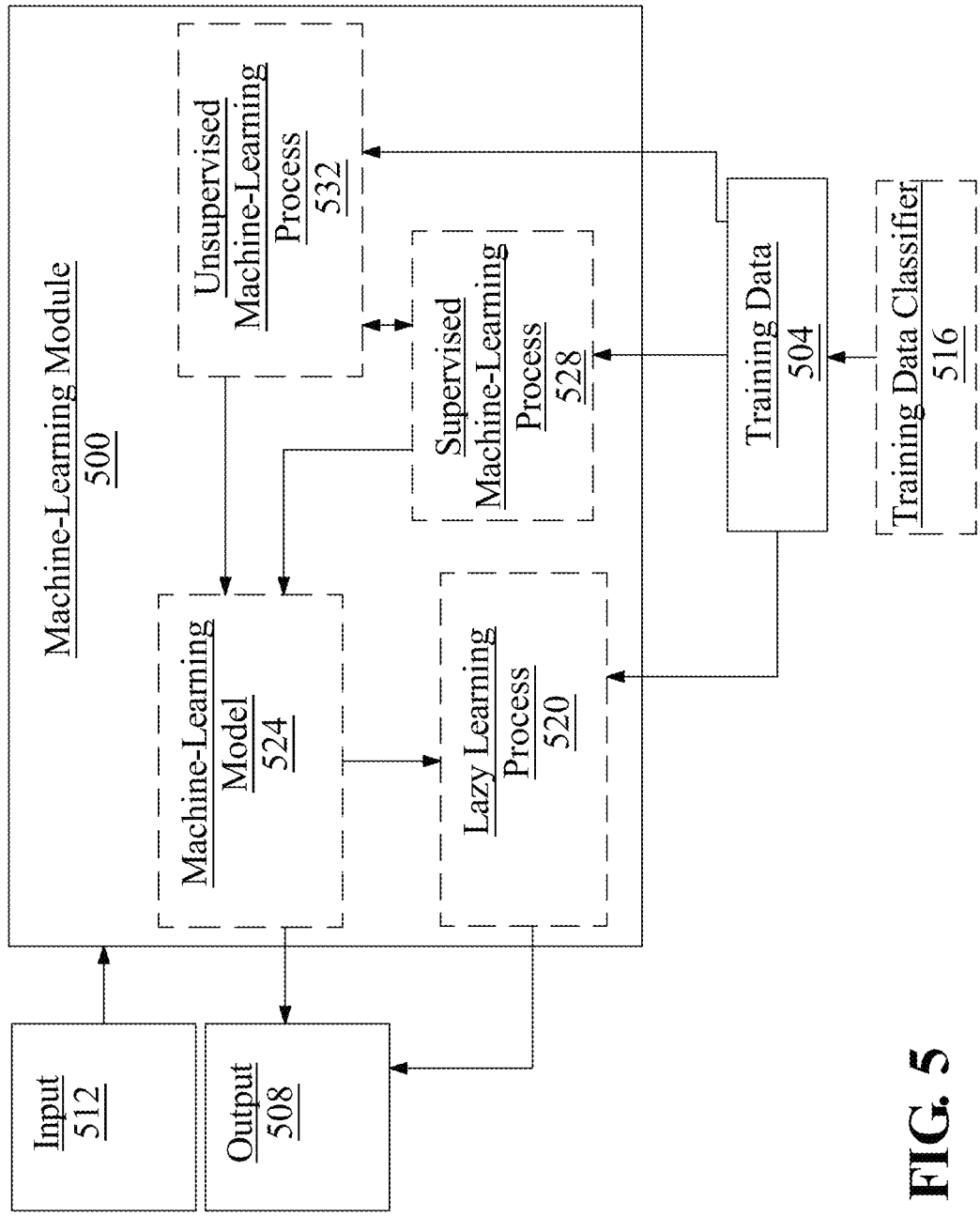
FIG. 5 is a block diagram of a machine learning model.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example input data may include design files and output data may include manufacturing processes.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to stages of a manufacturing process.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include design files as described above as inputs, manufacturing processes as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
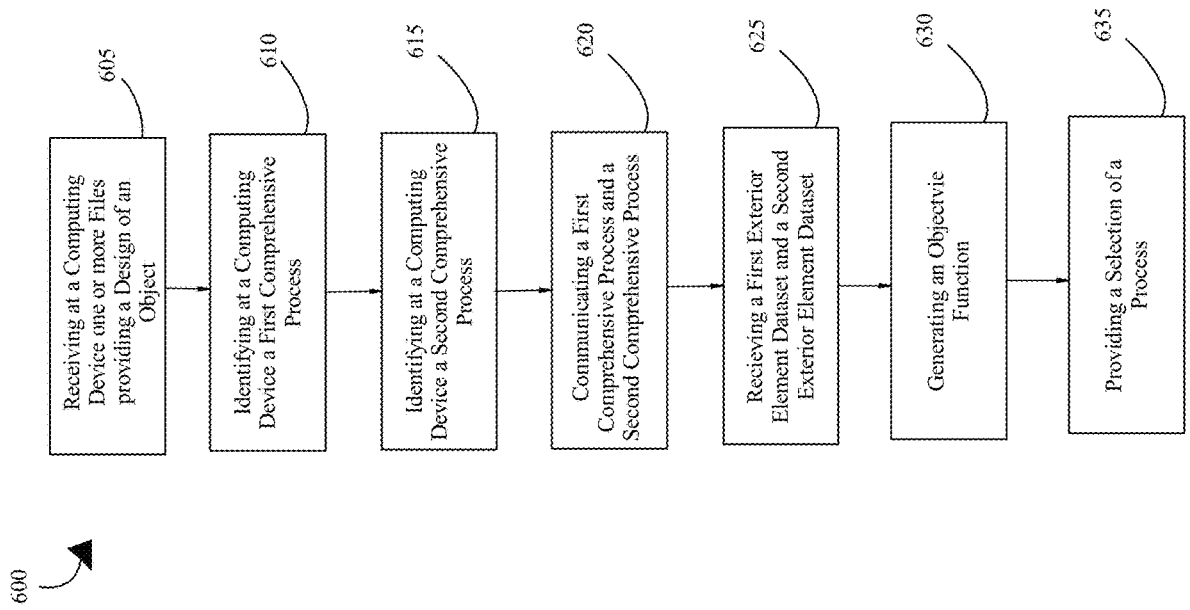
FIG. 6 is a flowchart of a method of selecting a plurality of entities to manufacture an object.

Referring now to FIG. 6, a method 600 of selecting a plurality of entities to manufacture an object is presented. At step 605, method 600 includes receiving at a computing device one or more files providing a design of an object. In some embodiments, a design of an object may include a manufacturing part. Receiving a design of an object may be as described above in FIGS. 1-2.

Still referring to FIG. 6, at step 610, method 600 includes identifying at a computing device a first comprehensive process. A first comprehensive process may include a process for manufacturing an object. A first comprehensive process may be as described above in FIGS. 1-2.

Still referring to FIG. 6, at step 615, method 600 includes identifying at a computing device a second comprehensive process. A second comprehensive process may include a process distinct from a first comprehensive process. A second comprehensive process may be as described above in FIGS. 1-2.

Still referring to FIG. 6, at step 620, method 600 includes communicating a first comprehensive process and a second comprehensive process. In some embodiments, a first comprehensive process and a second comprehensive process may be communicated through one or more application programming interfaces. An application programming interfaces may communicate a process to a plurality of third parties. In some embodiments, communicating a first comprehensive and a second comprehensive process may be as described above in FIGS. 1-2.

Still referring to FIG. 6, at step 625, method 600 includes receiving a first exterior element dataset and a second exterior element data set. A first exterior element dataset may include data from a third party about a first comprehensive process for manufacturing an object. A second exterior element dataset may include data from a third party about a second comprehensive process for manufacturing an object. In some embodiments, receiving a first exterior element dataset and a second exterior element data set may be as described above in FIGS. 1-2.

Still referring to FIG. 6, at step 630, method 600 includes generating an objective function. Generating an objective function may include comparing a first comprehensive process to a second comprehensive process. An object function may include a linearization problem. In some embodiments, an objective function may include an optimization criteria. Generating an objective function may be as described above in FIGS. 1-2.

Still referring to FIG. 6, at step 635, method 600 includes providing a selection of a process. A selection of a process may be generated from an objective function. A selection of a process may include a process for manufacturing an object. A selection of a process may be displayed to a user through a GUI. In some embodiments, providing a selection of a process may be as described above in FIGS. 1-2.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
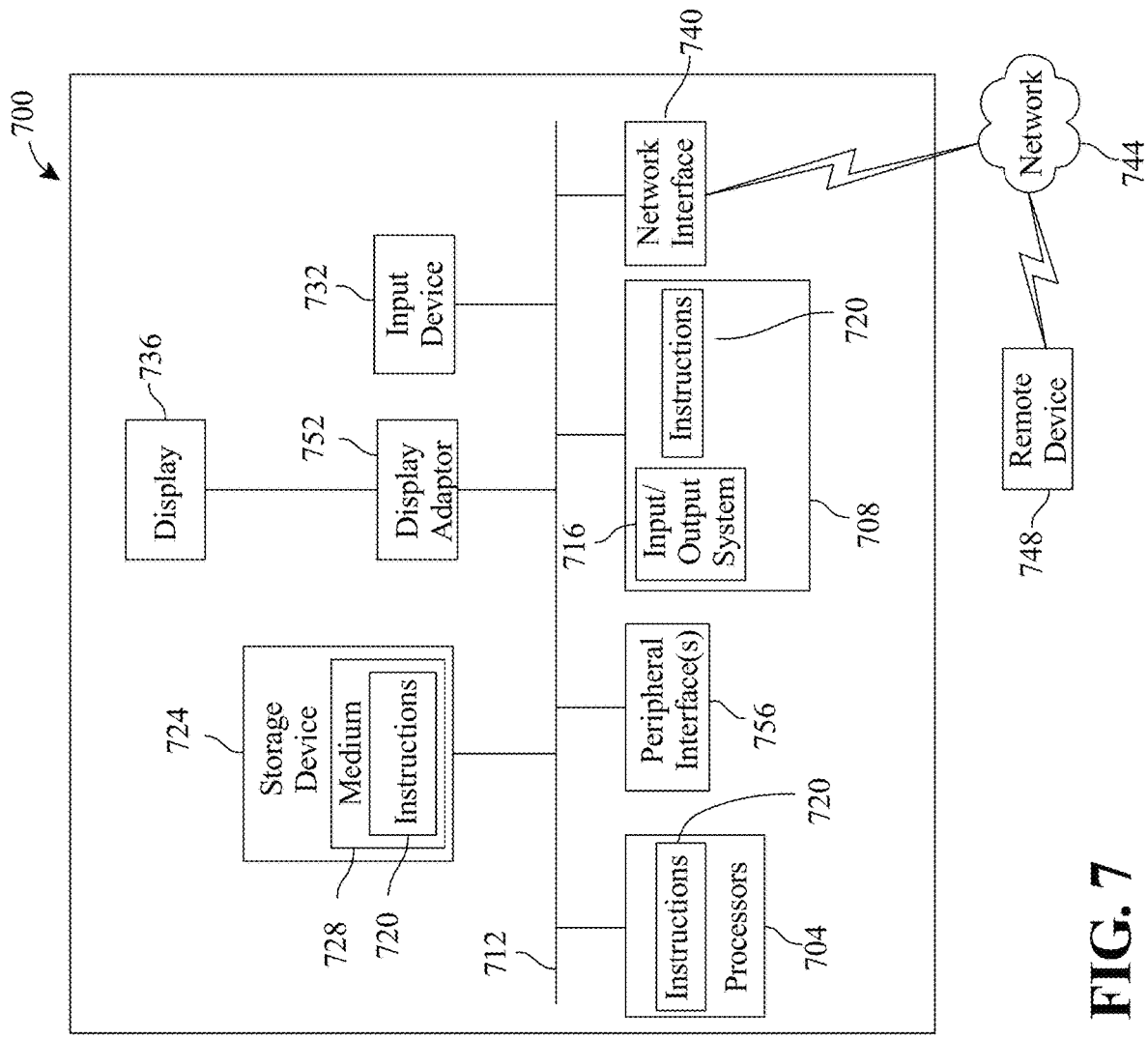
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Still referring to FIG. 7, processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Still referring to FIG. 7, memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Still referring to FIG. 7, computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Still referring to FIG. 7, computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

Still referring to FIG. 7, a user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Still referring to FIG. 7, computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for selecting processes to manufacture an object, the system comprising a computing device designed and configured to:
   receive, at the computing device, one or more files providing a design of an object to be manufactured
   identify, as a function of the design:
   a first comprehensive process for manufacturing the object using a first exterior element; and
   a second comprehensive process for manufacturing the object using a second exterior element, wherein the first exterior element is distinct from the second exterior element;
   communicate the first comprehensive process and the second comprehensive process via one or more application programming interfaces to one or more remote computing devices of third parties;

receive from the one or more remote computing devices via the one or more application programming interfaces, a first exterior element dataset and a second exterior element dataset;

generate an objective function of the first exterior element dataset and the second exterior element dataset, the objective function comprising at least one optimization criterion configured to assign weights to at least one attribute as a function of relative importance of the at least one attribute; and provide a selection of a process of the first comprehensive process and the second comprehensive process based on the objective function.

2. The system of claim 1, wherein the computing device is further configured to determine the first comprehensive process and the second comprehensive process as a function of a specification data model of the object.

3. The system of claim 2, wherein the specification data model comprises a plurality of links between external design files.

4. The system of claim 1, wherein the computing device is configured to provide a selection of a process as a function of a current step of a plurality of steps of the first comprehensive process for manufacturing the object.

5. The system of claim 1, wherein the computing device is configured to filter the first exterior element dataset and the second exterior element dataset from each of the third parties as a function of an optimization criteria.

6. The system of claim 1, wherein the computing device is further configured to communicate via the one or more application programming interfaces a manufacturing parameter of the object.

7. The system of claim 6, wherein the manufacturing parameter comprises a threshold.

8. The system of claim 1, wherein providing the selection further comprises performing linear optimization of the objective function.

9. The system of claim 1, wherein the computing device is further configured to provide the selection as a function of a machine-learning model.

10. The system of claim 1, wherein providing a selection of a process further comprises displaying the selected process to a user through a GUI.

11. A method of selecting a plurality of entities to manufacture an object, the method comprising:

receiving, at a computing device, one or more files providing a design of an object to be manufactured;

identifying, at the computing device, as a function of the design, a first comprehensive process for manufacturing the object using a first exterior element;

identifying, at the computing device, as a function of the design, a second comprehensive process for manufacturing the object using a second exterior element;

communicating the first comprehensive process and the second comprehensive process via one or more application programming interfaces to one or more remote computing devices of third parties;

receiving, from the one or more remote computing devices via the one or more application programming interfaces, a first exterior element dataset and a second exterior element dataset;

generating an objective function of the first exterior element dataset and the second exterior element dataset, the objective function comprising at least one optimization criterion configured to assign weights to at least one attribute as a function of relative importance of the at least one attribute; and providing a selection of a process of the first comprehensive process and the second comprehensive process based on the objective function.

12. The method of claim 11, wherein the first exterior element is distinct from the second exterior element.

13. The method of claim 11, wherein the selected process is provided as a function of a current step of a plurality of steps of the first comprehensive process for manufacturing the object.

14. The method of claim 11, wherein the computing device is configured to filter the first exterior element dataset and the second exterior element dataset from each of the third parties by an optimization criteria.

15. The method of claim 11, wherein the one or more files comprises a plurality of links between external design files.

16. The method of claim 11, wherein communicating the first comprehensive process and the second comprehensive process via the one or more application programming interfaces further comprises communicating a manufacturing parameter of the object.

17. The method of claim 11, wherein the objective function comprises performing linear optimization.

18. The method of claim 11, wherein providing a selection of a process further comprises training a machine-learning model.

19. The method of claim 11, wherein providing a selection of a process further comprises displaying the selected process to a user through a GUI.

20. The method of claim 11, further comprising a cloud-based network.

* * * * *